US007049955B2

(12) United States Patent
Bundy, IV

(10) Patent No.: US 7,049,955 B2
(45) Date of Patent: May 23, 2006

(54) METHOD AND APPARATUS FOR DISABLED ACCESS TO GAS STATIONS

(75) Inventor: H. Hollister Bundy, IV, Northfield, IL (US)

(73) Assignee: Inclusion Solution LLC, Chicago, IL (US)

( * ) Notice: Subject to any disclaimer, the term of this patent is extended or adjusted under 35 U.S.C. 154(b) by 95 days.

(21) Appl. No.: 10/133,877

(22) Filed: Apr. 26, 2002

(65) Prior Publication Data

US 2003/0201890 A1 Oct. 30, 2003

(51) Int. Cl.
*G08B 1/08* (2006.01)
*H04Q 1/00* (2006.01)

(52) U.S. Cl. ............................ 340/539.1; 340/539.11; 340/539.14; 340/825.19; 340/573.1; 206/575

(58) Field of Classification Search ............ 340/539.1, 340/539.11, 825.69, 825.72, 825.19, 286.06, 340/301, 307, 308, 539.14
See application file for complete search history.

(56) References Cited

U.S. PATENT DOCUMENTS 3,651,512 A * 3/1972 Summers ............... 340/825.19
6,087,954 A * 7/2000 McSpadden et al. ... 340/825.19
2002/0125167 A1 9/2002 Hughes, Jr. et al.

* cited by examiner

*Primary Examiner*—Donnie L. Crosland
(74) *Attorney, Agent, or Firm*—Schiff Hardin LLP

(57) ABSTRACT

A kit is provided for service stations and gas stations to increase accessibility by disabled persons. The kit includes a bell button for mounting near a gas pump and a speaker for mounting inside the store of the service station for alerting an attendant that refueling assistance is needed. Signs indicating the availability of refueling assistance are also provided in the kit. Optional items for the kit include a doorbell switch for the doorway into the service station store and potentially an access ramp. The kit may include additional signs, a checklist, a tape measure, and a doorstop. Installation instructions for the equipment is provided along with training guidelines for staff, tax forms and other accessibility information. A method for increasing accessibility to service stations for disabled persons is also provided.

15 Claims, 3 Drawing Sheets

METHOD AND APPARATUS FOR DISABLED ACCESS TO GAS STATIONS

BACKGROUND OF THE INVENTION

1. Field of the Invention

The present invention is related generally to a method and apparatus for facilitating use of an automobile gas station by a disabled person, and in particular to a kit and method for improving access to service station businesses and buildings to persons with disabilities.

2. Description of the Related Art

Persons with disabilities are increasing by willing and able to travel about without requiring an able bodied person to travel with them. Automobiles, vans and other vehicles are routinely modified to accommodate the disabled driver, including by wheel chair lifts, alternate controls for the accelerator and brake floor pedals, etc. The disabled driver may, thus, drive the vehicle with the same ease as other drivers. However, the disabled driver may have a more difficult time exiting the vehicle and may have more difficulty moving about outside the vehicle.

These difficulties become even more apparent at gas stations, also referred to as service stations. In the past, a vehicle entering a service station was met by an attendant who would pump the gasoline or other fuel into the vehicle's fuel tank and often checked the oil and cleaned the windows. This service has, for the most part, been discontinued as most gas stations are now self service. The self service gas station requires that the customer, usually the vehicle's driver, exit the vehicle, operate the fuel pump to pump the fuel into the vehicle's fuel tank, and pay for the purchase, either at the pump or inside the gas station's building.

For a driver in a wheelchair to perform these tasks, the driver would be required to exit the vehicle by lowering of a wheelchair lift from the side of the vehicle and exit the wheelchair lift, usually at the end of the lift farthest from the vehicle. This places the wheelchair-bound person in the traffic flow lanes of the service station, and as such places them at risk of being struck by a vehicle. Many service stations have only a limited width for the traffic lanes, and the wheelchair-bound driver may not have space to lower the lift and exit the vehicle due to the presence of structures or other vehicles in the way. Even if the wheelchair-bound person is able to exit the vehicle, it may be difficult or even dangerous for the wheelchair-bound person to operate the gas pump. The disabled driver who successfully manages to exit the vehicle and operate the gas pump may find the way back into the vehicle blocked by another vehicle parked at another gas pump.

The service station may have an attendant who can assist the disabled driver in refueling the vehicle, but the attendant may not know that the driver needs assistance. The disabled driver does not know which service station has an attendant who can assist in refueling of the vehicle.

In addition to the difficulties encountered in vehicle refueling, the person with disabilities may have difficulty obtaining access to the convenience stores that are increasingly more common at service stations and gas stations. These difficulties may relate to curbs or steps which cannot be traversed, doors which the person may be unable to open unaided, doorways which are too narrow for a wheelchair, etc. Important opportunities are missed by the business by unintentionally excluding the disabled customer, and the disabled person also misses out on the opportunities that await inside.

Laws have been enacted that require businesses to make changes to make themselves accessible to people with disabilities. Some of the laws relate to access at refueling facilities. However, businesses, particularly small businesses, are unaware of what measures can, or should, be taken to increase accessibility by disabled individuals and/or cannot afford high-cost measures such as renovation of store fronts or electronic power door openers.

SUMMARY OF THE INVENTION

The present invention provides a kit for enabling access by disabled persons to commercial establishments including service stations, gas stations and other vehicle refueling centers. According to a first aspect of the invention, the kit provides a signaling apparatus for the disabled person to signal the need for assistance to an attendant at the service station. According to a second aspect of the invention, the kit provides signs with which the disabled person is informed of the availability of assistance. According to a third aspect of the invention, the kit includes information to the operator of the service station to inform the operator of measures to increase accessibility to the service station to disabled persons. According to a fourth aspect of the invention, the kit includes equipment to facilitate access by disabled persons to the service station building(s).

A kit according to the present invention may include any or all of the foregoing aspects. The kit provides the materials and/or information needed by a business to make changes so that the business or facility is more inclusive.

The present invention also includes a method for increasing access by persons with disabilities to service stations and gas stations. Specifically, the present invention also relates to a method of increasing access by persons with disabilities to service stations and to a method of providing access equipment to service station businesses and facilities. The first mentioned method includes the steps of providing signs, bells and other equipment and information so that persons with disabilities have increased access to service station businesses and refueling facilities. The second mentioned method of providing equipment and information to service station businesses and refueling facilities includes providing the equipment and information in a kit and marketing the kit to service stations businesses as a commercial unit. A further aspect of the method is that the commercial unit may include an order form for businesses to separately order an access ramp or other equipment.

DESCRIPTION OF THE PREFERRED EMBODIMENTS

Figure 1:
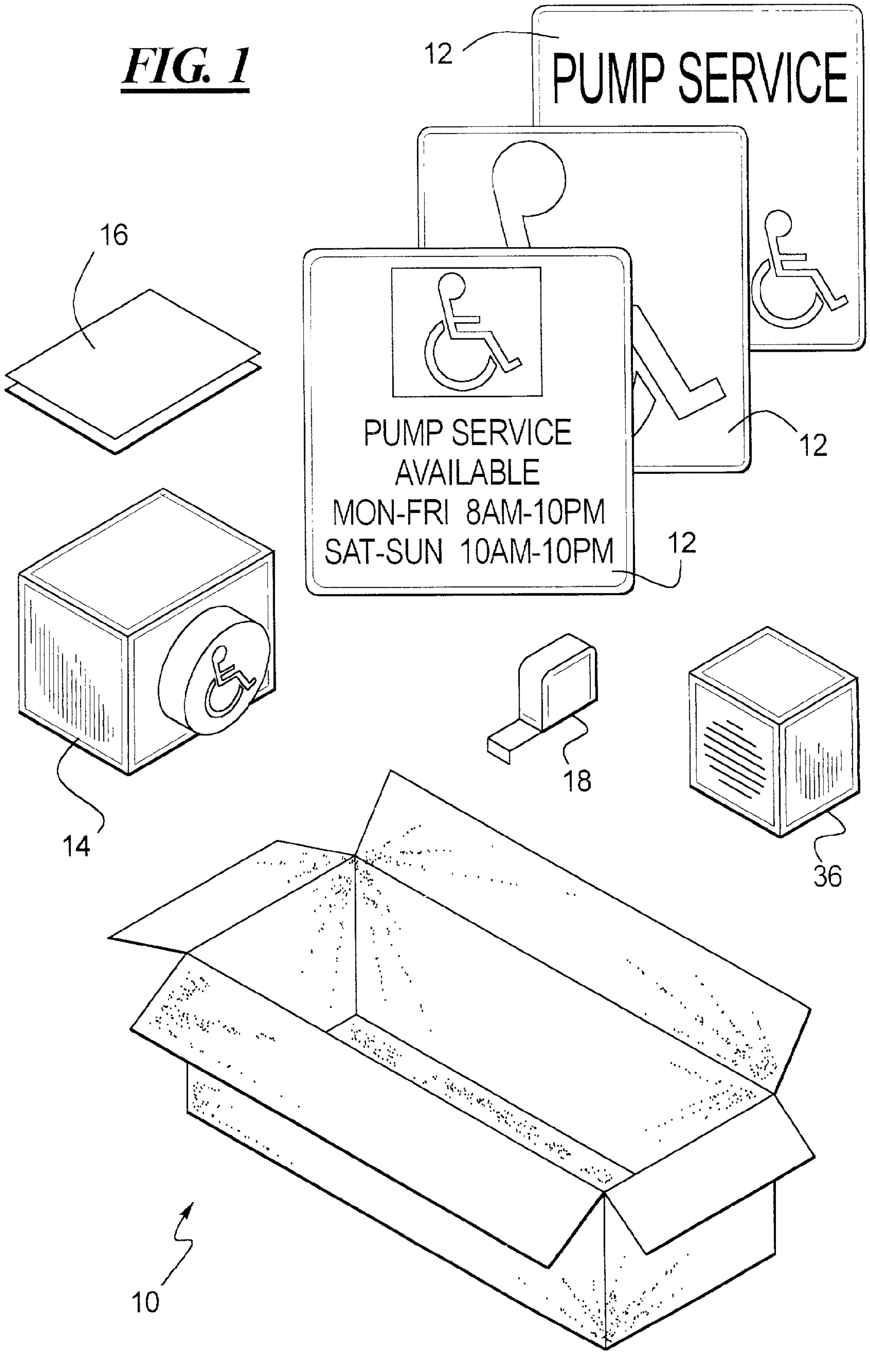
FIG. 1 is a perspective view of a kit according to the present invention.

According to the present invention and as shown in FIG. 1, a kit 10 is provided for sale to businesses and facilities, particularly service stations and other vehicle refueling businesses. The kit 10 includes information and equipment to assist the service station business or facility in becoming accessible to persons with disabilities. The kit 10 includes, for example, a sign 12 to indicate availability of refueling help, an easy to activate bell button 14, installation instructions and refueling center guidelines 16, and may include a tape measure 18 and potentially other information and equipment in a single commercial unit. Furthermore, the kit 10 may include, as an option, materials for each service island, including additional signs and additional easily activated bell buttons.

The service station business owner or manager may be aware of the positive effects on the business by increasing access for persons with disabilities, elderly persons, parents with small children, pregnant women, and others needing assistance. The business owner or manager is able to purchase the present kit 10 through channels including, but not limited to, local office supply stores, other retail stores, through umbrella organizations such as chambers of commerce, through industry resellers and distributors, or by directly ordering the kit 10. As a further advantage, the kit 10 may be purchased by a parent company or franchisor for distribution and use by the individual stores and/or franchisees. The kit 10 assists the business owner or manager to understand the issues relating to access for disabled persons to service stations and refueling centers and provides the equipment and information needed to make their business accessible. Access is improved without the expense of consultants, contractors and/or attorneys.

Figure 2:
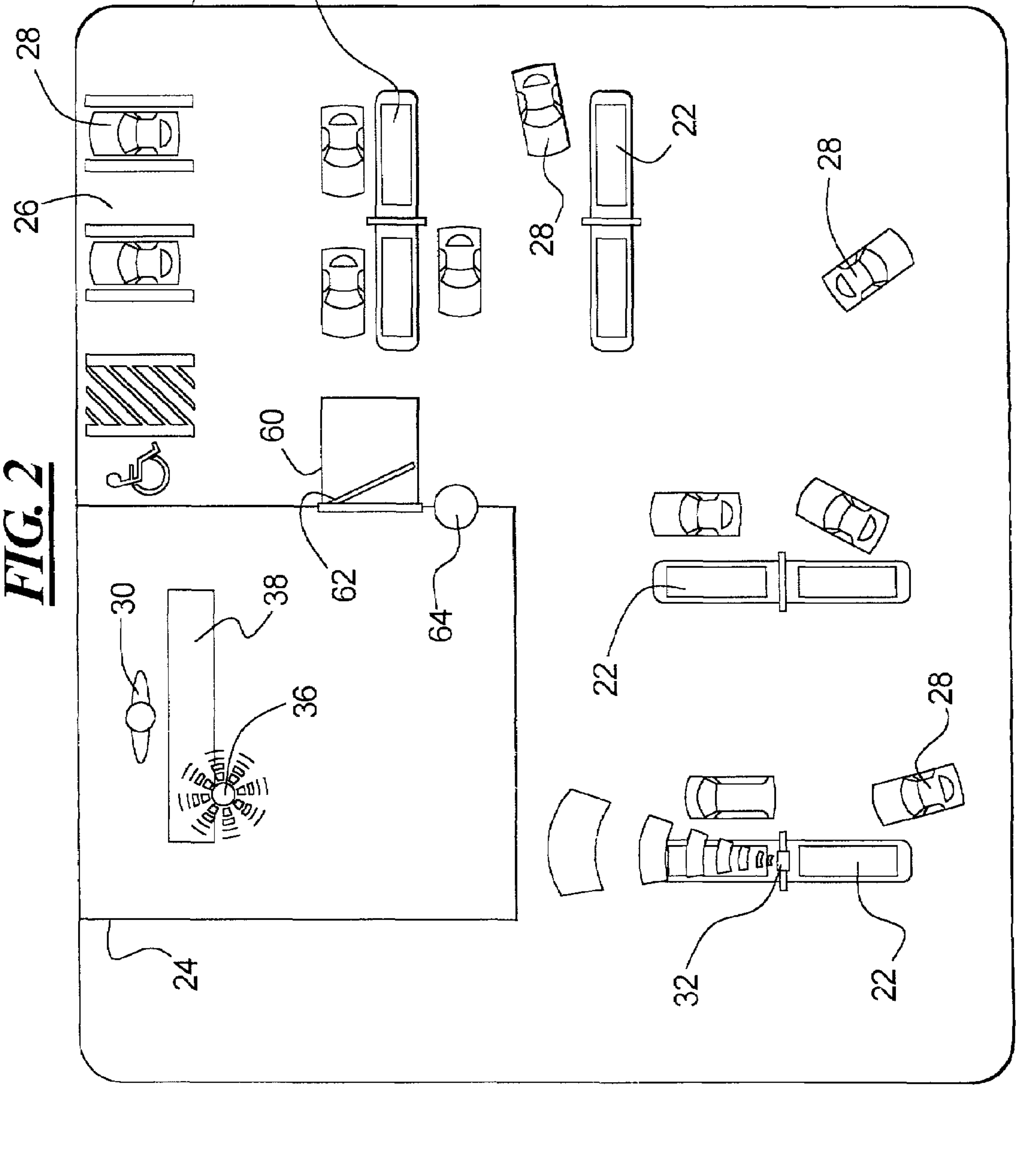
FIG. 2 is a plan view of a service station, or gas station, at which the kit of the present invention has been installed.

Referring first to FIG. 2, a service station 20, also referred to as a gas station or refueling facility, is shown including four gas pump islands 22, a store 24 and parking places 26 for vehicles. A number of vehicles 28 are present at the service station 20. The gas pump islands 22 in the drawing have four refueling locations per island, two on each side. A vehicle 28 pulls along side the gas pump island 22 at an open refueling location and is refueled by operation of the gas pump. This usually involves insertion of the pump nozzle into the fuel tank opening of the vehicle 28 and turning on of the pump. The pump nozzle and the attached hose can be somewhat heavy and awkward for the disabled person to operate or may be mounted at a height that is too high for them, and, if the disabled person is in a wheelchair, the possibility that some fuel may escape the nozzle raises the possibility of fire or explosion should it contact the electronics of the wheelchair.

The service station 20 therefore has an attendant 30 on duty who can assist the disabled person in refueling the vehicle 28. According to the first aspect of the invention, a signaling apparatus 32 is provided to permit the disabled person to signal to the attendant 30 the need for assistance. The signaling apparatus 32 of the preferred embodiment includes the bell button 14 mounted at or near the gas pump island 22. The disabled person operates the bell button 14, which causes an audible signal to be emitted that indicates to the attendant 30 that assistance is needed at the fuel pump.

In one embodiment, the operation of the bell button 14 causes the audible signal to be emitted from a speaker 36 mounted in the store 24 or building of the service station. The speaker 36 is preferably mounted near the attendant 30, such as near the desk or counter 38 at which the attendant stands. To facilitate easy installation of the present bell button 14 and speaker 36, they are linked by radio signals. The bell button 14 is provided with a short range radio transmitter and the speaker 36 is provided with a corresponding radio receiver. The bell button 14 is powered by batteries and the receiver may be plugged into a standard AC wall socket within an attached kiosk or store where employees of the gas station are located. A battery-operated receiver is an alternative.

Since the bell button 14 is to be mounted near a gas pump 22, the bell button must be constructed to avoid sparks to reduce the chance of igniting gasoline vapors. The present bell button 14 is adapted for operation in such an environment so long as it is mounted at least 18 inches from the pump itself.

By mounting the bell button 14 adjacent the gas pumps at the gas pump island 22 and mounting the speaker 36 within hearing distance of the attendant 30, the service station is made more accessible to the disabled person. The disabled person may pull their vehicle along side the gas pump island 22 and operate the bell button 34 to alert the attendant 30 to the need for refueling assistance.

The bell button 14 and speaker, also referred to as a receiver, 36 are provided together in the kit 10 for the service station. The kit 10 may have a single bell button 14 and speaker or receiver 36, or may have multiple bell buttons 14. The kit 10 may include an order form for ordering additional bell buttons 14 and/or additional speakers or receivers 36. In the service station 20 as shown, several bell buttons 14 may be provided, each at corresponding ones of the gas pump islands 22. All are tuned to the same radio transmitting frequency so that they all activate the speaker 36 inside the store 24. Alternately, each bell button 14 emits a different signal so that the speaker 36 sounds a different alert for each different pump. The attendant may thereby more easily identify which vehicle 28 needs assistance.

A further feature provides that a voice module may be present in the speaker housing and connected to cause the speaker 36 to emit a spoken announcement of the need for assistance at the gas pump. Further, the voice module may cause the speaker 36 to announce which of the gas pumps has a vehicle 28 that is requesting assistance.

The FIG. 2 shows a typical service station. Of course, other configurations are possible. The service station or refueling facility may be a dedicated refueling facility, or may be coupled to a service garage, a store or a restaurant. The service station may be located in a town, near a residential neighborhood, or along a highway. The refueling facility may be solely for automobiles and light trucks or may be a refueling center for large freight hauling trucks, referred to as a truck stop. The gas pump islands may have a single gas pump or any number of pumps or refueling locations. Gas pumps of various configurations are also contemplated. While the illustrated embodiment is disclosed in conjunction with service stations for selling gasoline (also known as petrol) or diesel fuel, alternate fuel sources are also encompassed within the scope of the present invention, including liquid propane, electricity, natural gas, alcohol, ethanol, and others.

According to the second aspect, signs 12 are provided for the service station. Examples of the signs 12 are shown in FIG. 1. The signs 12 indicate that the service station has an attendant 30 available to assist disabled customers. In some instances, the sign 12 may be simply the international symbol for disabled access, characterized by a stylized person in a wheelchair in white on a blue field. The signs 12 may be in the kit 10 or may be ordered as needed to complement the contents of the kit 10. Preferably, the kit 10 includes a sign 12, such as a sign having a large disabled access symbol, for mounting on or near the gas pump 22 and a sign 12 with more detailed information for mounting adjacent the bell button 14. In addition, the kit 10 may have a sign 12 for mounting on the store 24 or building, such as in a window.

At least one of the signs 12 displays hours of availability of refueling assistance for disabled persons, according to a preferred embodiment. For example, the sign 12 may indicate that pump service is available Monday through Thursday 10:00 a.m. to 6:00 p.m. and Friday through Sunday 10:00 a.m. to 4:00 pm. This sign 12 is posted so that the service station customer may readily see it, such as being posted on or near the gas pumps 22. Advantages are provided by such an informational sign that has customizable and changeable elements to that the sign can be changed to reflect a change in assistance hours, for example, and that the service station owner also has the alternative of indicating that refueling assistance is available where feasible. The signs 12 in the kit 10 are, in one embodiment, self-adhesive and so may readily be mounted by the service station manager or owner as necessary.

Figure 5:
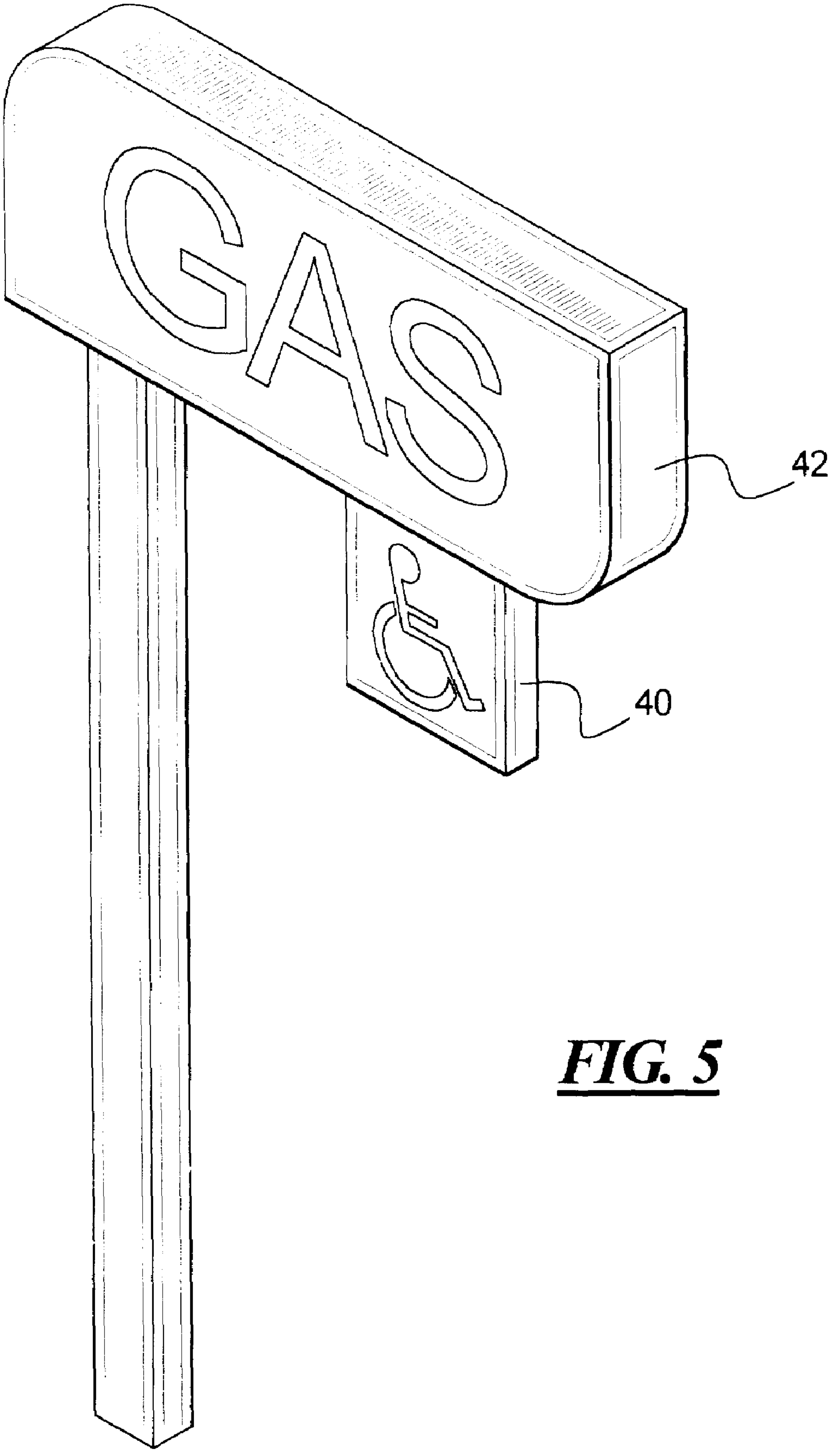
FIG. 5 is an elevational view of a portion of a highway sign for the service station with a supplemental sign indicating pump service.

As shown in FIG. 5, a further option is that a sign 40 is provided for mounting on the highway sign 42 for the service station 20. This sign 40 alerts motorists to the availability of assistance for disabled drivers at the advertised service station. The sign 40 may be provided in the kit 10 or may be ordered with an order form provided in the kit 10. As an alternative, or addition, the sign 40 is provided on the canopy over the pump islands 22. The sign may be mounted on the surface of the canopy or highway sign 42, hanging below it, or extending sideways therefrom. A separate mounting post may be provided in some cases.

Figure 3:
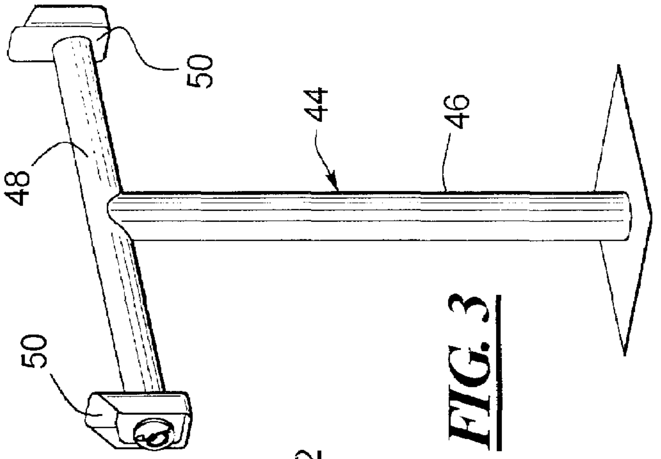
FIG. 3 is a perspective view of a stand for mounting the bell button near a gas pump.

Once in the service station 20, the disabled customer should be able to easily reach the signally apparatus 32, in one example, the bell button 14, without leaving the vehicle 28. To facilitate positioning the bell button 14 within the customer's reach, the present invention provides, as an optional accessory in the kit 10, a T-bar 44, as shown in FIG. 3. The T-bar has a vertical post 46 for mounting on the island 22 near the gas pumps and a cross bar 48 at the top of the post 46. At each end of the cross bar 48 is a mounting plate 50 on which the bell button 14 is mounted. The illustrated T-bar 44 positions the bell buttons 14 for activation from both sides of the gas pump island 22, so that a customer on either side may activate the signaling apparatus.

The T-bar 44 is not the only configuration possible. A single sided support bar having an inverted L shape may be required in some installations. Other arrangements and shapes of supports for the signaling apparatus are possible as well, and are encompassed within the scope of the present invention.

Figure 4:
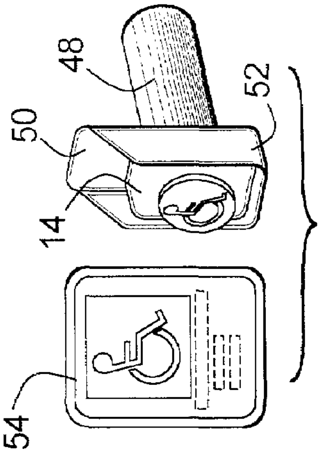
FIG. 4 is an enlarged perspective view of the bell button on the stand of FIG. 3.

The T-bar 44, or other shaped support, positions the bell button 14 within the driver's reach, but in doing so also puts the bell button 14 at risk of being struck by a vehicle 28. Therefore, the improvement of FIG. 4 is provided, namely a protective shield 52 that partially encloses the bell button 14. The shield 52 of the illustrated embodiment extends about the sides and bottom of the bell button 14. The mounting plate 50 is provided with a vertical extension greater than the height of the bell button 14. The vertical extension provides space for an added sign, such as the sign 54 to the left side of FIG. 4, which instructs the customer to "ring bell for refueling assistance." According to the third aspect of the present invention, the kit 10 has information 16 as shown in FIG. 1 to assist the service station manager or owner in making the service station more accessible to disabled customers. This information includes guidelines for refueling assistance for people with disabilities from the Americans with Disabilities Act and the United States Department of Justice. The information 16 in the kit 10 provides installation and mounting instructions for the signs and equipment so that they are most effective at increasing access. The information 16 may suggest mounting heights for the bell button 14, for example. This information 16 is complemented by the tape measure 18 included in the kit 10 to ensure that the person installing the kit 10 has the necessary tools available to properly install the equipment. The tape measure 18 is also used by the business or facility personnel in measuring the height of the steps or curbs, the location and height of the doorbell switch 64 and the width of the doorway at the entrance 62, the widths of aisles and other measurements for accessibility per the checklist.

In addition to the information for installation of the equipment, the kit 10 also includes information for training the attendant in assisting disabled persons at a refueling center. Specifically, the kit 10 is provided with the card or booklet 16 having a checklist which provides a concise list of tasks to make the business or facility accessible. Also included is information training of staff and employees to respond to the call for assistance, to assist the customer in refueling the vehicle 28 and to provide other assistance if necessary. The information 16 provided assists in training the staff to be aware of the needs of people with disabilities. This information may be in the form of a handout or other materials providing tips for interacting with customers with disabilities.

A further item in the kit is a booklet 44 explaining in plain language the requirements of the Americans with Disabilities Act (ADA) for the business owner or facilities manager to use as a guide. The kit 34 may also include a form or information on tax credits for expenses incurred in making the business accessible.

According to the fourth aspect of the invention, additional equipment is available to increase access by persons with disabilities. The equipment includes a removable ramp 60 as shown in FIG. 2 over a step at the entrance 62 of the store 24, an easily activated door bell switch 64 linked wirelessly to the speaker 36 inside the store 24, and a sign indicating an accessible entrance. In a further embodiment, a doorstop is provided to hold the door 62 open while the person with disabilities enters the store 24.

The doorbell switch 64, when activated, alerts those inside that assistance is needed and that the ramp 60 may be required. The doorbell switch 64 may be provided on a wall or other structural portion of the store 24. As an alternative, the doorbell switch 64 and/or the sign are mounted on a post set at a convenient location. The present kit may include an order form for the post. Not only is the location of the switch important, but the height of the switch must be such that it can be reached by persons in wheelchairs, such as at a height of 36 inches from the floor or ground.

Prior to installation of the equipment according to the present invention, a person encountering the entrance 62 in a wheelchair or who is otherwise unable to traverse a step and/or open a door would be unable to enter the building or may do so only with considerable difficulty. The service station owner or facilities manager is able to purchase and install the present access kit so that the step no longer presents a barrier to a person who uses a wheelchair, scooter or walker. The ramp enables access by persons having a variety of disabilities, but does not alone overcome the obstacles to access. For this reason, the doorbell switch 64 and sign are provided. A person who is unable to open the door, or traverse the portable ramp 60 without assistance, is able to alert the attendant 30 by activating the doorbell switch 64.

In a preferred embodiment, the doorbell switch 64 is relatively large and requires minimal pressure to activate. In one embodiment, the doorbell switch is round, approximately three inches (7.5 cm) in diameter, and marked with the international symbol for accessibility. Because the doorbell switch 64 may be mounted outside, it preferably has a cover of weather resistant plastic. The size and format of the doorbell switch 64 permits a person with limited manual dexterity to activate it with a fist, for example, rather than a finger. The doorbell switch can also be activated by a cane or other implement.

The doorbell switch 64 has a battery power supply and a radio transmitter. The radio transmitter preferably operates on an industry-standard frequency which is picked up by the receiver of the speaker 36. The doorbell 64 and speaker 36 may be plugged into a standard AC wall socket. The transmitter of a preferred embodiment has a range of 20 to 125 feet, although other ranges are also possible. The doorbell switch 64 is therefore a self-contained unit which does not require external wiring, and is easy to install.

Upon activation of the doorbell switch 64, the speaker 36 sounds, alerting the staff of the service station of the presence of a disabled person who needs assistance. The doorbell switch 64 is mounted near a sign. The sign has the international symbol for disabled accessibility along with text indicating that the person should ring for assistance and may indicate that a portable ramp is available. A separate text sign for these instruction is also possible. In one embodiment, the sign is 2.5 inches by 5 inches and attaches directly to the door bell switch.

The ramp 60 of the present invention provides access over curbs and steps for wheelchairs, scooters, and baby strollers of all types. The ramp 60 is portable and can therefore be put into place when needed and removed at other times. It can also be moved to other doorways, steps and curbs as the need arises.

The preferred ramp is of aluminum, is three feet long, hinged to fold to a package six inches across, weighs 16 pounds, has a width of 30 inches and a capacity of 600 pounds. One example of such a ramp is offered by Home-Care Products. It therefore provides a full width driving surface for wheelchairs, scooters or baby strollers. Side rails of, for example, 2 inches height, extend along both sides as a safety guide and for added strength. The top surface is provided with a non-skid track to prevent slipping. The preferred ramp 60 is thus convenient to store and easy to set up so as to provide access over curbs and steps.

Ramps of other dimensions are also provided, according to the present invention, according to the height and/or number of steps to be traversed. A chart may be provided in the present kit which correlates the height of a step or incline over which the ramp is to run with a length of ramp to achieve predetermined slope. For example, a ramp angle of 4.8 degrees or less is ideal, while a ramp angle of up to 7.2 degrees may be acceptable. The proper size ramp may then be ordered from the kit supplier or from another source.

The ramp 60 is optional and its use depends upon the configuration of the entrance and the presence of a curb or one or more steps. A business owner who does not need a ramp 60 may purchase the present kit without it. The removable ramp 60 is held in position by pins that fit into corresponding holes bored into the step. Slippage of the ramp during use is thereby prevented. The pins are optional and their use may depend upon the configuration and material of the step. Other means for holding the ramp 60 in place may also be used.

If a ramp 60 is provided, either as part of the kit 10 or as an optional item ordered latter, information is also provided to train the attendant or staff to assist the customer up and down the ramp as a qualified helper and to provide other assistance as needed to the customer with disabilities.

Thus, the present invention provides a kit 10 for service stations to increase accessibility for disabled persons. One such kit 10 is sold as a commercial unit in a box, although other arrangements of the kit items may be provided.

The present invention therefore provides a readily achievable upgrade to a service station or refueling business or facility to increase access by disabled persons. The materials included in the present kit 10 enable the service station to become more accessible without the expense of experts, consultants, and/or lawyers to interpret the laws and study the facilities. The access solution can be matched to the financial resources of the business and does not require the business owner or manager to become an expert in disability access laws to implement the improvements. Further, the present kit provides access equipment that is reasonably priced for the business owner and avoids costly equipment like automatic door openers and other specialized products or renovation.

It is foreseen that the present kit 10 is provided for sale at retail outlets such as office supply stores, through direct sales, through umbrella organizations, through industry resellers and distributors, or through catalogs or other order facilities, including on-line ordering. Alternately, the parent company or franchisor may purchase the kits for each franchise location or store.

According to the invention, a method of providing access capability to a service station is provided. The service station owner or manager is made aware of disabled access issues using the materials in the kit 10 and may easily implement increased access using the supplied materials and information. The signaling devices are installed and the attendants are trained to assist in refueling.

The provided information is reviewed to determine if a ramp 60 is needed and training of the attendant or other staff in the installation and use of the ramp 60 is provided. A checklist of other accessibility issues is reviewed to whether additional action is needed. These additional changes may include, but are not limited to, moving tables and fixtures to provide an aisle of at least 36 inches and covering or removing plush carpet over which a wheelchair would have difficulty moving. Policy changes of the organization may also be required. If so, a custom redesign of the facilities is performed.

The employees and staff are trained in the use of the materials. This training may include use of materials from government agencies, not-for-profit organizations and other organizations to assist disabled persons, which are listed in a resource guide included in the kit 10. The business person may then seek a tax credit for the expenses incurred.

The disabled person who patronizes the service station recognizes from the signage that this is an accessible facility having trained qualified helpers for refueling and other assistance. If the ramp 60 is needed, it is installed and assistance is offered, so that the disabled person can enter the store 24. The ramp 60 should be removed if it interferes with the entry and exit of non-disabled persons. Once the person is in the store 24, continued assistance may be provided. The commerce is completed and the ramp 60, if needed, is put down and assistance is offered to exit the store 24. Once the disabled person has safely exited the store 24, the ramp 60 is removed.

The speaker 36 and radio receiver may, for example, be a model RC 3730 wireless chime or may be an RC 3520 battery operated receiver which are products of Dimango/Lamson Home Products. For locations where multiple doorbells are located near to one another, a multiple frequency coded receiver may be provided for the bell button 14. Corresponding transmitter codes for the bell button, the doorbell switch and the transmitter would be used as well. The doorbell switch and speaker 36 may be hardwired to one another where this is feasible.

If the service station is noisy, such as a service station having a service garage where air wrenches and the like are in use, the speaker 36 may include a flashing light to alert the attendant that a customer requires refueling assistance.

Although other modifications and changes may be suggested by those skilled in the art, it is the intention of the inventors to embody within the patent warranted hereon all changes and modifications as reasonably and properly come within the scope of their contribution to the art.

I claim:

1. A kit for facilitating use of a gas station by a disabled person, comprising:

a container for enclosing components of the kit;

a button housing in said container and having an actuator button for mounting within easy reach of a disabled person, said button housing having a radio transmitter, said button housing being adapted for mounting adjacent a gasoline dispensing pump;

an alarm housing in said container and having a radio receiver in radio communication with said radio transmitter of said button housing, said alarm housing having a speaker connected to said radio receiver; and a sign in said container for mounting adjacent said button housing in a vicinity of the gasoline dispensing pump, said sign indicating an availability of refueling assistance for the disabled person.

2. A kit as claimed in claim 1, further comprising:

a sign in said container for mounting at the gas station indicating availability of pump service.

3. A kit as claimed in claim 2, wherein said sign is lists hours for the availability of refueling assistance and can be modified as necessary.

4. A kit as claimed in claim 1, wherein said sign is adapted for mounting at a window of the gas station.

5. A kit as claimed in claim 1, further comprising:

a tape measure in said container.

6. A kit as claimed in claim 1, further comprising:

guidelines to Department of Justice Refueling Policy Requirements in said container.

7. A kit as claimed in claim 1, further comprising:

installation instructions in said container.

8. A kit as claimed in claim 1, further comprising:

guidelines to state initiatives to service station accessibility in said container.

9. A kit as claimed in claim 1, further comprising:

a mounting post adapted to mount said button housing.

10. A method for improving access to a gas station by a disabled person, comprising the steps of:

providing a bell button housing having a bell button and a radio transmitter connected to said bell button, said bell button housing adapted for mounting adjacent a gas pump;

providing an alarm housing having a radio receiver and a speaker connected to said speaker, said alarm housing adapted for mounting inside a gas station building, said speaker emitting an alarm sound when said bell button is actuated;

providing a sign adapted for mounting adjacent said bell button housing, said sign including a notice relating to availability of refueling assistance; and a container enclosing said bell button and said alarm housing and said sign.

11. A method as claimed in claim 10, further comprising the step of:

instructing service station personnel in assisting disabled persons in refueling of a vehicle.

12. A method as claimed in claim 10, further comprising the step of:

instructing service station personnel in refueling guidelines for disabled persons.

13. A method as claimed in claim 10, further comprising the step of:

providing an access ramp for use at the gas station.

14. A method of increasing access to service stations for disabled persons, including the steps of:

assembling a kit of materials and information into a container for use at a service station to increase accessibility for disabled persons, wherein said step of assembling includes the substeps of:

including a bell button in said container of said kit, said bell button having an actuator and a radio transmitter connected to said actuator to emit a radio signal upon actuation of said actuator;

including a speaker in said container of said kit, said speaker having a radio receiver connected to said speaker to emit an audible sound upon receipt of said radio signal from said bell button; and including a sign in said container of said kit, said sign indicating the availability of refueling assistance;

offering said kit in said container for sale to service stations, whereby said service stations may install items in said kit to increase accessibility for disabled persons; and instructing an installer on installation of the materials of the kit at predetermined locations at the service station to increase accessibility for disabled persons, said step of instructing including:

instructing the installer to install the bell button at a predetermined location at the service station that is accessible for disabled persons, and instructing the installer to install the sign at a predetermined location at the service station that is viewable by disabled persons.

15. A method as claimed in claim 14, wherein said step of instructing includes:

including instructional materials in said container for installation of said bell button at the predetermined location; and including training information in said container for an attendant to assist in refueling of a vehicle.

* * * * *